United States Patent
Turnock et al.

(10) Patent No.: US 9,911,015 B2
(45) Date of Patent: Mar. 6, 2018

(54) METHODS FOR PROLONGING BATTERY LIFE IN TOLL TRANSPONDERS

(71) Applicant: Kapsch TrafficCom AG, Vienna (AT)

(72) Inventors: Richard Turnock, Toronto (CA); Alastair Malarky, Petersburg (CA); Weimin He, Richmond Hill (CA)

(73) Assignee: Kapsch TrafficCom AG, Vienna (AT)

( * ) Notice: Subject to any disclaimer, the term of this patent is extended or adjusted under 35 U.S.C. 154(b) by 177 days.

(21) Appl. No.: 14/052,950

(22) Filed: Oct. 14, 2013

(65) Prior Publication Data

US 2014/0132398 A1 May 15, 2014

(30) Foreign Application Priority Data

Nov. 15, 2012 (CA) ..................................... 2796278

(51) Int. Cl.
*H04Q 9/00* (2006.01)
*G06K 7/10* (2006.01)
*G07B 15/06* (2011.01)

(52) U.S. Cl.
CPC ....... *G06K 7/10207* (2013.01); *G07B 15/063* (2013.01)

(58) Field of Classification Search
CPC .................................................... G07B 15/063
USPC ....................................... 340/10.1–10.6, 928
See application file for complete search history.

(56) References Cited

U.S. PATENT DOCUMENTS

| 5,157,375 A * | 10/1992 | Drori .................. B60R 25/1004 340/426.17 |
|---|---|---|
| 5,525,992 A * | 6/1996 | Froschermeier ............. 340/10.2 |
| 5,621,412 A | 4/1997 | Sharpe et al. |
| 5,729,722 A * | 3/1998 | Matsumoto .................... 713/601 |
| 6,081,718 A * | 6/2000 | Ando et al. .................... 455/447 |
| 6,340,934 B1 | 1/2002 | Hisada |
| 7,286,040 B2 * | 10/2007 | Karabinis .................... 340/10.1 |
| 7,379,897 B2 * | 5/2008 | Pinkus ............................ 705/16 |
| 8,135,442 B2 * | 3/2012 | Ichikawa .................... 455/569.2 |
| 2005/0128104 A1* | 6/2005 | Karabinis ...................... 340/933 |
| 2006/0082470 A1* | 4/2006 | Zhu et al. ...................... 340/928 |
| 2008/0068131 A1* | 3/2008 | Cargonja et al. ............ 340/10.1 |
| 2009/0115578 A1* | 5/2009 | Geissler ................... H04Q 9/00 340/10.1 |
| 2009/0184847 A1* | 7/2009 | Kohli et al. .................. 340/989 |
| 2009/0201169 A1* | 8/2009 | d'Hont et al. ........... 340/825.49 |
| 2010/0217558 A1* | 8/2010 | Tan ..................... G01P 15/0891 702/141 |

(Continued)

OTHER PUBLICATIONS

Office Action received for Mexican Patent Application No. MX/a/2013/013364, dated Nov. 13, 2015, 4 pages (2 page of English Translation and 2 pages of Official copy).

(Continued)

*Primary Examiner* — Edwin Holloway, III
(74) *Attorney, Agent, or Firm* — Fiala & Weaver P.L.L.C.

(57) ABSTRACT

A transponder, such as an electronic toll transponder, is configured to recognize when it is being subjected to consistent and repeated trigger signals over an extended period of time and, in response, the transponder enters a reduced-responsiveness state. In the reduced-responsiveness state, the transponder may only intermittently respond to detected trigger signals. The transponder may recognize when the repeated trigger signal situation has been resolved and then return to normal responsiveness.

18 Claims, 4 Drawing Sheets

(56) References Cited

U.S. PATENT DOCUMENTS

2010/0223205 A1* 9/2010 Almodovar Herraiz
 et al. .............................. 705/400
2013/0293422 A1* 11/2013 Guner ........................... 342/386

OTHER PUBLICATIONS

Office Action received for Mexican Patent Application No. MX/a/2013/013364, dated Jun. 19, 2015, 4 pages (2 pages of English Translation and 2 pages of Official copy).
Office Action received for Mexican Patent Application No. MX/a/2013/013364, dated Jan. 29, 2016, 6 pages (3 pages of English Translation and 3 pages of Official copy).
Extended European Search report received for European Patent Application No. 13187247.5, dated Nov. 7, 2016, 11 pages.
Office Action received for European Patent Application No. 13187247.5, dated Apr. 11, 2017, 7 pages of European Office Action.

* cited by examiner

METHODS FOR PROLONGING BATTERY LIFE IN TOLL TRANSPONDERS

CROSS-REFERENCE TO RELATED APPLICATION(S)

This application claims priority to Canadian Patent Application No. 2,796,278, filed on Nov. 15, 2012, the entirety of which is incorporated by reference herein.

BACKGROUND

Technical Field

The present application relates to electronic toll collection (ETC) systems and, in particular, to methods for prolonging battery life in toll transponders and to transponders implementing such methods.

Background Art

In Electronic Toll Collection (ETC) systems, Automatic Vehicle Identification (AVI) is achieved by the use of Radio Frequency ("RF") communications between roadside readers and transponders within vehicles. Each reader emits a coded identification signal, and when a transponder enters into communication range and detects the reader, the transponder sends a response signal. The response signal contains transponder identification information, including a unique transponder ID.

Active transponders contain a battery that powers the transponder. The manufacturers of transponders generally equip the transponder with a battery sized to provide the transponder with sufficient power to last for a number of years. In some cases, the manufacturers may guarantee that the transponder will last for a minimum number of years. The guarantee may be based on a calculated average number of trigger-read cycles for normal use of the transponder in ETC systems.

ETC transponders are now being leveraged for additional applications. For example, in some cases additional roadside readers may be used to count vehicles for traffic monitoring and management purposes. In some cases, toll transponders may be used for parking or other electronic payment transactions. In some situations, these additional uses are being implemented by third parties and not the original ETC infrastructure provider. Accordingly, toll transponders may end up being polled more often that might be anticipated by the ETC infrastructure provider, particularly when a transponder-equipped vehicle is parked or idling near a reader (whether an ETC reader or another type of reader). This can result in far more trigger-read cycles than was originally anticipated by the ETC infrastructure provider, and will negatively impact the lifespan of the toll transponder battery.

It would be advantageous to improve the battery life a toll transponder.

BRIEF SUMMARY

In one aspect, the present application discloses a method of managing battery life of a toll transponder. The method is implemented by the toll transponder and it includes repeatedly detecting trigger signals and sending a response signal in reply to each trigger signal, and determining that a threshold parameter has been reached during the repeatedly detecting and, based on that determination, entering a reduced-responsiveness state during which some detected trigger signals are ignored.

In another aspect, the present application describes a transponder configured to implement one or more of the methods described herein.

Other aspects and features of the present application will be apparent to those of ordinary skill in the art from a review of the following detailed description when considered in conjunction with the drawings.

BRIEF DESCRIPTION OF THE DRAWINGS/FIGURES

Reference will now be made, by way of example, to the accompanying drawings which show embodiments of the present application, and in which.

Similar reference numerals are used in different figures to denote similar components.

DETAILED DESCRIPTION

Figure 1:
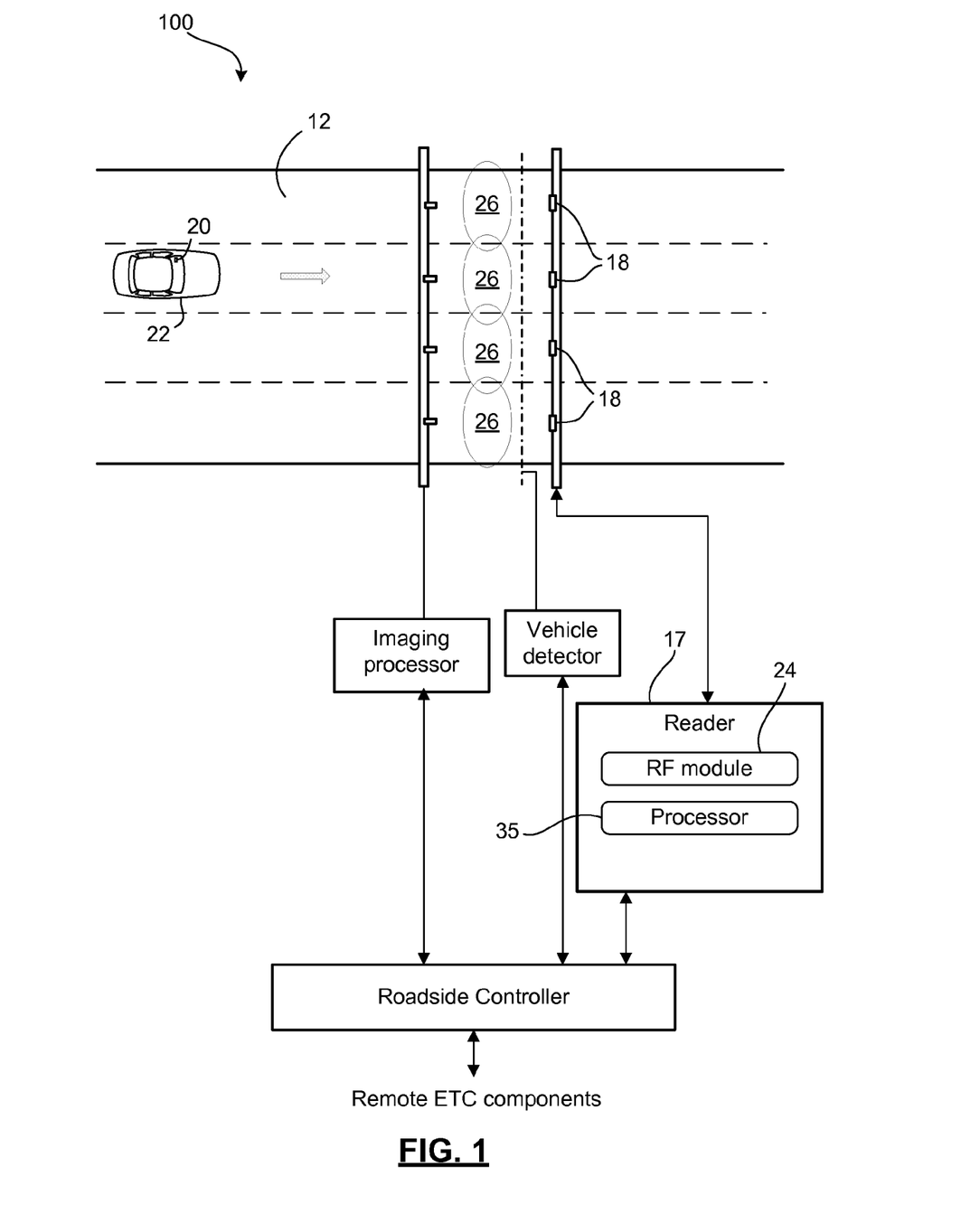
FIG. 1 shows, in block diagram form, an example electronic toll collection (ETC) system, according to an embodiment.

Reference is first made to FIG. 1, which shows, in block diagram form, an example electronic toll collection (ETC) system 100. The ETC system 100 is employed in connection with a roadway 12 having one or more lanes for vehicular traffic. The arrow indicates the direction of travel in the roadway 12. For diagrammatic purposes, a vehicle 22 is illustrated in the roadway 12. In some instances, the roadway 12 may be an access roadway leading towards or away from a toll highway. In other instances, the roadway 12 may be the toll highway.

Vehicle 22 is shown in FIG. 1 with a transponder 20 mounted to the windshield. In other embodiments, the transponder 20 may be mounted in other locations.

ETC system 100 includes antennas 18 connected to an automatic vehicle identification (AVI) reader 17. The reader 17 generates signals for transmission by the antennas 18 and processes signals that are received by the antennas 18. The reader 17 includes a processor 35 and one or more radio frequency (RF) modules 24 (one is shown for clarity). In many implementations, each antenna 18 may have a dedicated RF module 24; although in some embodiments an RF module 24 may be shared by more than one antenna 18 through time multiplexing. In some implementations, the RF modules 24 may be separate from the reader 17. In some example implementations, the RF modules 24 may be integrated into their respective antennas 18.

The antennas 18 are directional transmit and receive antennas which, in the illustrated embodiment, are oriented to define a series of capture zones 26 extending across the roadway 12 in an orthogonal direction. The arrangement of capture zones 26 defines the communication zone within which toll transactions are conducted using an ETC communications protocol. The arrangement shown is only one example embodiment; it will be understood that other configurations and arrangements of capture zones are possible. In some embodiments, the transmit and receive functions may be implemented using separate antennas.

The ETC system 100 may operate, for example, within the industrial, scientific and medical (ISM) radio bands at 902-928 MHz. For example, the ETC system 100 may conduct communications at 915 MHz. In other embodiments, other bands/frequencies may be used, including 2.4 GHz, 5.9 GHz, etc.

In this embodiment, the ETC system 100 operates using an active transponder. In general, an active transponder is battery powered and generates and transmits a response signal when it detects a trigger signal broadcast from one of the antennas 18. The ETC system 100, and in particular the reader 17 and antennas 18, continuously polls the capture zones 26 using time-division multiplexing to avoid interference in overlapping capture zones 26. In another example, the ETC system 100 may alternatively, or also, use frequency-division multiplexing. The polling may take the form of sending a trigger or polling signal and awaiting a response signal from any transponder that happens to be within the capture zone 26. In the application herein the term "trigger signal" is used to refer to a signal intended to cause any transponder in the capture zone to send a response signal if it detects the trigger signal.

In the ETC system 100, vehicles are first detected when they enter the capture zones 26 and the vehicle-mounted transponder 20 responds to a trigger signal broadcast by one of the antennas 18. The frequency of the polling is such that as the vehicle 22 traverses the capture zones 26, the transponder 20 receives and responds to trigger signals from the reader 17 a number of times. Each of these trigger-responses may be referred to as a "handshake" or "reader-transponder handshake" herein.

Once the reader 17 identifies the transponder 20 as a newly-arrived transponder 20 it will initiate conduct of an ETC toll transaction. This may include programming the transponder 20 through sending a programming signal that the transponder 20 uses to update the transponder information stored in memory on the transponder 20.

ETC transponders are now being leveraged for additional applications. For example, in some situations roadside readers may be used to count vehicles for traffic monitoring and management purposes. In some cases, toll transponders may be used for parking or other electronic payment transactions, meaning that readers are installed at parking lot entrances, fast-food drive-through lanes, gas stations, or other locations. In some situations, these additional uses are being implemented by third parties and not the original ETC infrastructure provider. Accordingly, toll transponders may end up being polled more often that might be anticipated by the ETC infrastructure provider. This extra polling impacts the battery-life of the transponder, which is often guaranteed by the ETC infrastructure operator based upon projected use in the ETC system.

This may be particularly troublesome if a transponder-equipped vehicle is parked or idling in close proximity to a reader (whether an ETC reader or another type of reader), in which case the transponder may be continuously and repeated bombarded with trigger signals to which it generates and transmits a response signal. This can result in far more trigger-read cycles than was originally anticipated by the ETC infrastructure provider, and will negatively impact the lifespan of the toll transponder battery.

In accordance with one aspect of the present application, a transponder is configured to recognize when it is being subjected to trigger signals over an extended period of time and, in response, reduce its responsiveness. In a further aspect, the transponder may be configured to recognize when the repeated trigger signal situation has been resolved and then return to normal responsiveness.

Figure 2:
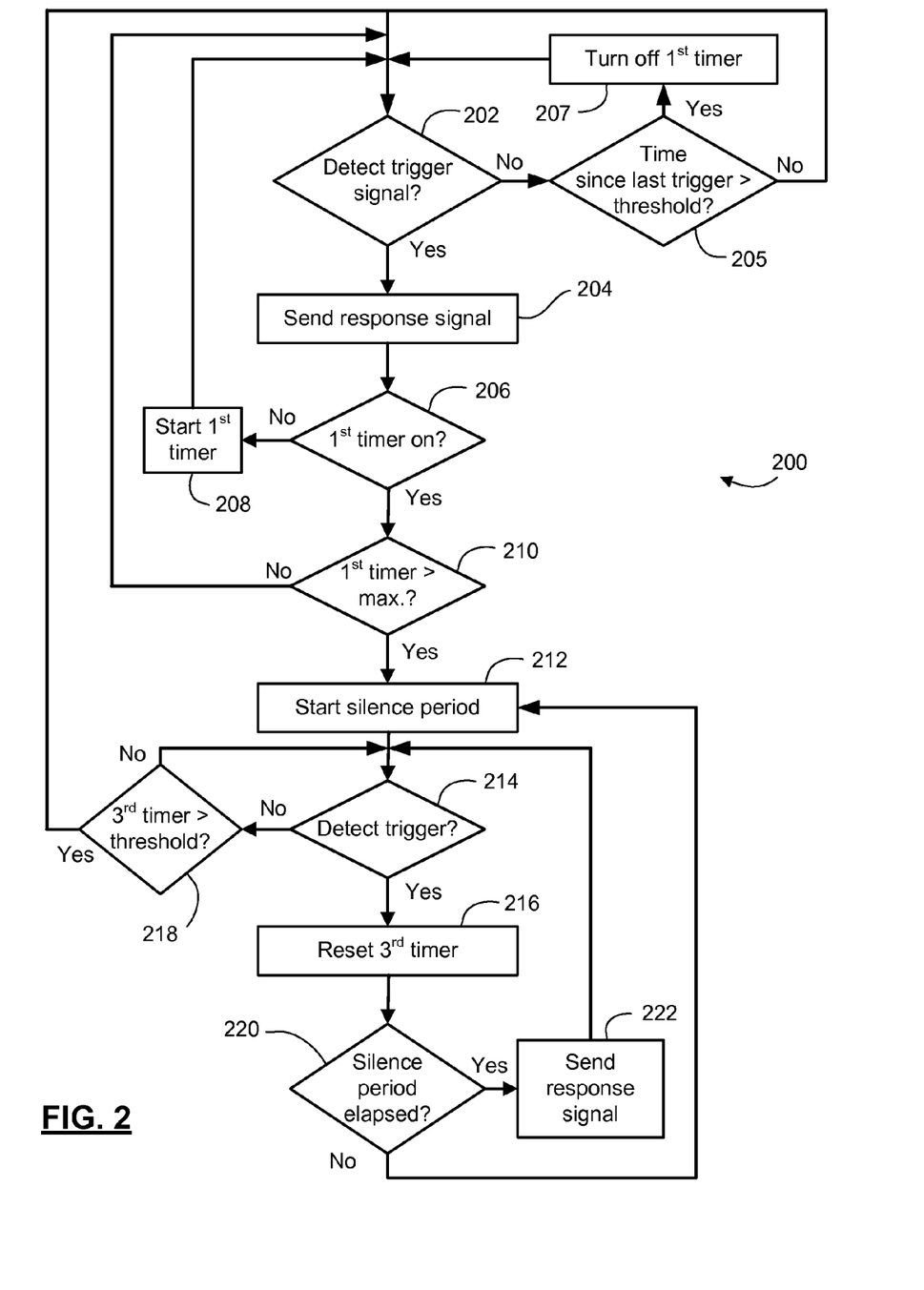
FIG. 2 shows, in flowchart form, an example method for managing transponder battery life using a reduced-responsiveness state, according to an embodiment.

Reference is now made to FIG. 2, which shows, in flowchart form, an example process 200 for managing battery life in a transponder. In this example, the transponder is configured, under normal operating conditions, to respond to a detected trigger signal by sending a response signal. The transponder may be configured to wait a short period of time after detecting the trigger signal before transmitting the response signal in order to avoid interference; however, in general it is configured to respond to every trigger signal detected by sending a response signal. In some embodiments, the response signal contains transponder identification data, including the transponder serial number and other such data.

In the example process 200, the transponder determines in operation 202 if it detects a trigger signal. In other words, the transponder listens for trigger signals. Once a trigger signal is detected the transponder sends a response signal, as indicated by operation 204. In operation 206, the transponder evaluates whether a first timer is on. If not, then it turns on the first timer in operation 208 and returns to operation 202 to await a further trigger signal. If the first timer has already been turned on, then the transponder evaluates whether it has been running for more than a maximum threshold length of time in operation 210. In essence, the first timer is used to determine for how long the transponder has been subjected to repeated trigger pulses.

Note that if a trigger signal is not detected in operation 202, the transponder monitors the time since the last trigger signal was detected and if it exceeds a threshold value, as indicated by operation 205, then in operation 207 the first timer is zeroed and turned off. It will then only be restarted in operation 208 when the next trigger signal is detected. In this manner, operations 205-210 use the first timer to track whether the transponder has been consistently receiving repeated trigger signals for more than a threshold length of time. If the regular trigger signals cease for a certain period, then the first timer is reset and is restarted when the transponder next starts to receive trigger signals.

If the first timer exceeds the maximum threshold length of time, then the transponder deems itself to be in a static situation in which trigger signals will continue to be received that are unconnected with processing of a toll transaction. Accordingly, the transponder is configured to enter a state of reduced responsiveness in this situation.

After the first timer is found to exceed the maximum threshold length of time, then in operation 212, the transponder starts a silence period. The first timer may be zeroed and turned off at this point. The silence period is a period during which the transponder ignores trigger signals. It may be configured to last for a predetermined length of time, or a predetermined number of trigger signals. This may be implemented using a second timer in some embodiments. In other embodiments, the silence period is configured to last indefinitely, as long as the transponder is still receiving regular successive trigger signals. A third timer may also be used to determine whether the situation of repeated triggers signals has changed and that the transponder should transition from the reduced-responsiveness state back to the normal state. Accordingly, operation 212 may further include starting the third timer for measuring the time since the last trigger pulse was detected.

The transponder then listens for a trigger signal in operation 214. If no trigger pulse is detected, then the transponder determines whether the third timer has expired as indicated in operation 218. This operation 218 corresponds to monitoring whether the time since the last trigger pulse was detected has exceeded some preset threshold duration that indicates that the transponder is no longer static in a capture zone of a reader and being subjected to repeated trigger pulses. If this threshold duration has elapsed, then the transponder leaves the reduced-responsiveness state and returns to operation 202 to operate in the normal responsiveness state.

If a trigger signal is detected, then in operation 216, the transponder resets or zeros the third timer, i.e. it restarts the timer measuring the time since the last trigger signal was detected. In operation 220 the transponder determines whether the silence period has elapsed. That is, it determines whether the transponder should continue ignoring trigger signals or whether it should send a response. As noted above, this may be based upon a count of trigger signals detected or may be based on an elapsed period of time, in some embodiments. If the silence period has not elapsed, then the process 200 returns to operation 214 to listen for further trigger signals. However, if the silence period has elapsed, then in operation 222 the transponder sends a response signal in reply to the detected trigger signal. It then returns to operation 212 to restart the silence period.

It will be understood that in some examples the silence period may be set such that the transponder responds to every Nth trigger signal in the reduced-responsiveness state. In one example, the transponder may be configured to respond to every 10th trigger signal. In some cases, the level of responsiveness (e.g. the value of N) may be set by a reader or by a user. In some other examples, the silence period may be set such that other levels of responsiveness are implemented in that state. As one example, the transponder may be configured to respond to multiple trigger signals (i.e. a burst of trigger signals) before re-entering the non-responsive portion of the reduced-responsiveness state.

In one embodiment, the transponder may be configured to enter a more-reduced-responsiveness state if the transponder is deemed to have been in the reduced-responsiveness state for a certain period of time. For example, if the transponder is responding to every tenth trigger signal and remains in the reduced-responsiveness state for a certain period of time (e.g. 5, 10 or 20 minutes), then the transponder may reconfigure the silence period such that it responds to every hundredth trigger signal. Further states of reduced responsiveness may also be defined in some embodiments.

Figure 3:
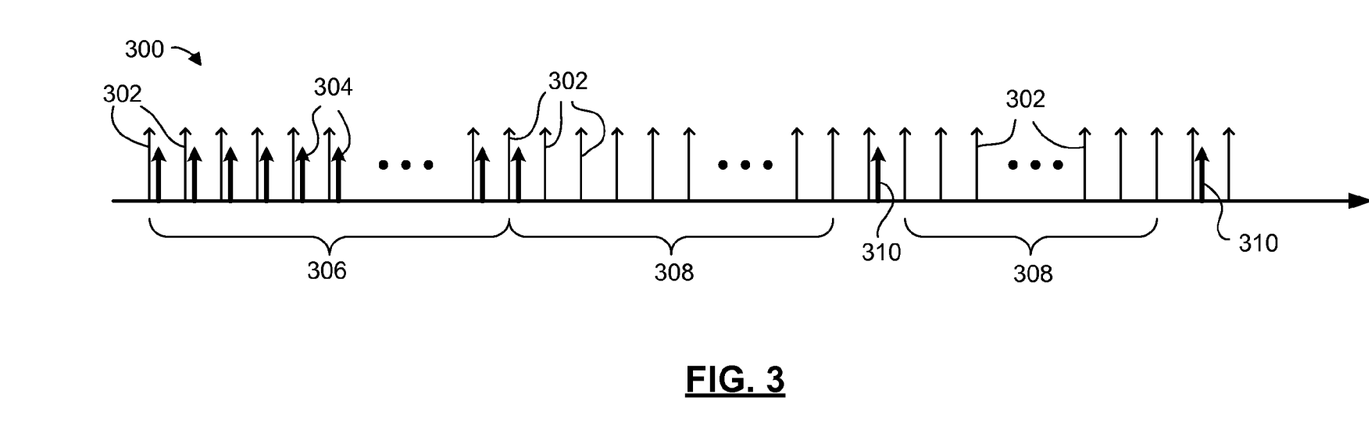
FIG. 3 shows an example timing diagram illustrating the onset of a reduced-responsiveness state, according to an embodiment.

An example is illustrated by a timing diagram 300 shown in FIG. 3. The timing diagram 300 shows (from left to right) a train of regular trigger signals 302 detected by a transponder within the coverage area or capture zone of a reader.

In this example, the transponder begins by sending a response signal 304 to each trigger signal 302 detected. This occurs until the first time elapses 306, indicating that the transponder has consistently detected trigger signals for more than the threshold length of time. At this point in time, the transponder enters its reduced-responsiveness state and implements a silence period 308. In this example, the silence period 308 is a preset duration during which the transponder ignores detected trigger signals and sends no response signal in reply.

After the silence period 308 elapses, the transponder sends a response signal 310, following which it implements another silence period 308. This continues until the transponder determines that it should return to the normal responsiveness state.

Figure 4:
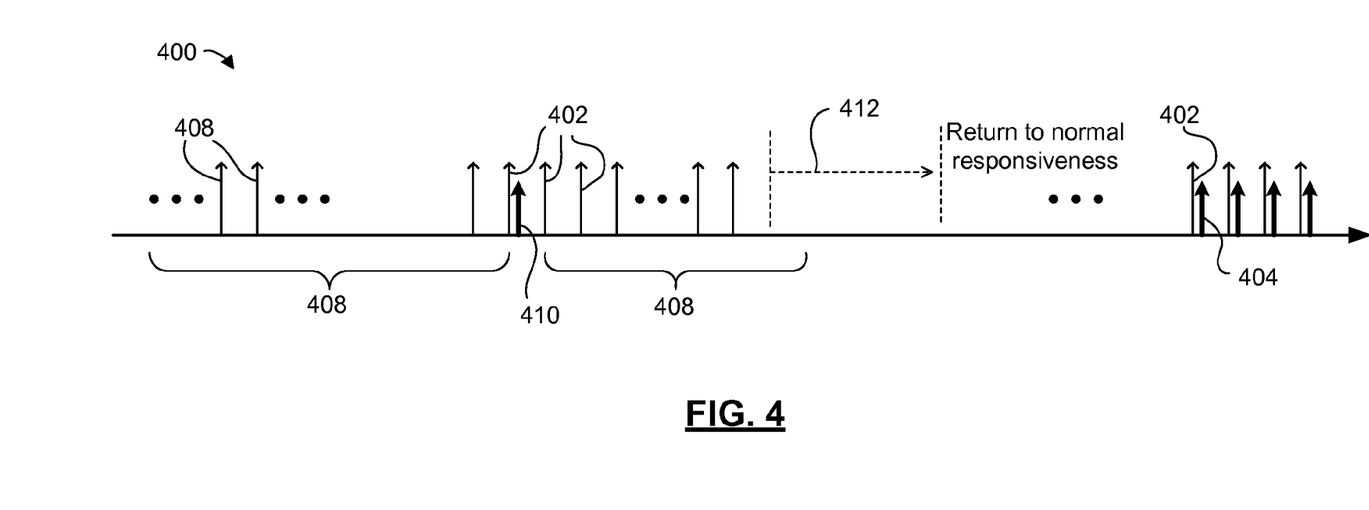
FIG. 4 shows an example timing diagram illustrating return to a normal-responsiveness state, according to an embodiment.

FIG. 4 shows a timing diagram 400 that illustrates an example of the return to a normal responsiveness state. In this example, the transponder is in a reduced-responsiveness state in which it ignores detected trigger signals during a silence period 408, then sends a response signal 410 in reply to a detected trigger signal 402 after each silence period 408, before implementing the next silence period 408.

As indicated by reference numeral 412, if the transponder fails to detect a trigger signal for a predetermined length of time, then it returns to normal responsiveness. This corresponds to expiry of the third timer discussed in connection with FIG. 2. It will be noted that after expiry of the third timer 412, when the transponder next detects trigger signals 402 it sends a response signal 404 to each trigger signal without interspersing responses with silence periods.

The maximum threshold length of time that marks expiry of the first timer (i.e. the transition to the reduced-responsiveness state) may be set having regard to the maximum length of time normally used to determine lane assignment and process a toll transaction in an ETC system. The maximum may take into account various scenarios that may be encountered, including slow moving traffic. In some cases, the transponder may be permitted to enter the reduced-responsiveness state when positioned in an ETC toll plaza for an extended period of time, such as when caught in a traffic stoppage, provided the reduced responsiveness does not impact lane determination/assignment and/or toll transaction processing.

In some embodiments, the transponder may be configured to temporarily or permanently disable the reduced-responsiveness state (i.e. remain in a normal responsiveness state) in response to a command from the reader. In some embodiments, the transponder may be configured to alter aspects of the foregoing processes on command from the reader. For example, the reader may instruct the transponder to delay onset of the reduced-responsiveness state by causing the transponder to increase the maximum threshold length of time against which the first timer is measured for determining whether to enter the reduced-responsiveness state. Other aspects of the processes described herein may be adjustable by way of reader command.

Figure 5:
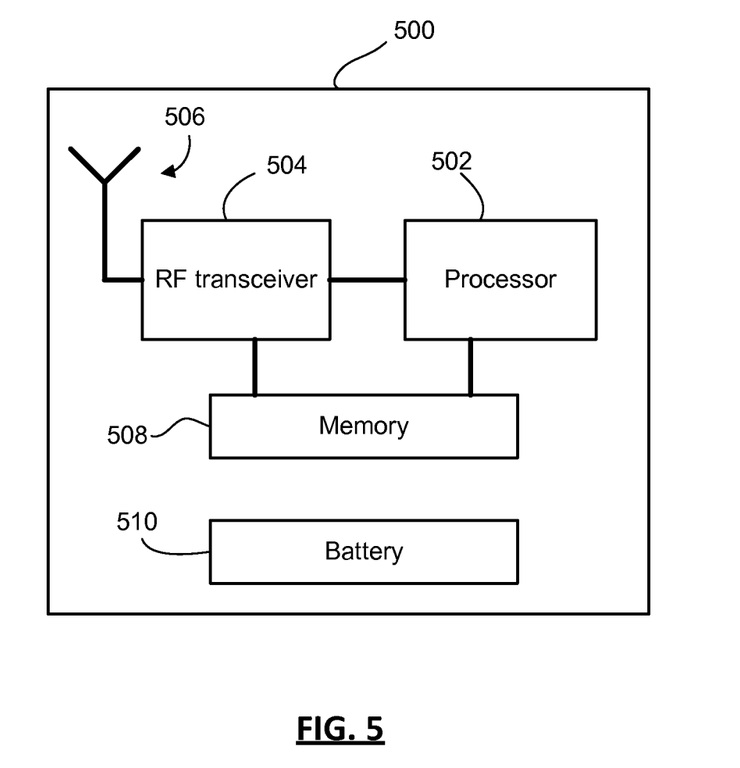
FIG. 5 shows, in block diagram form, an example transponder, according to an embodiment.

Reference is now made to FIG. 5, which shows, in block diagram form, an example embodiment of a transponder 500. The transponder 500 includes a processor 502, memory 508, an RF transceiver 504, an antenna 506, and a battery 510. It will be appreciated that this is a subset of the components that may be found in many implementations of the transponder 500.

The RF transceiver 504 and the antenna 506 are configured to detect and demodulate RF signals, particularly those in the range used by an associated ETC system. The RF transceiver 504 is also configured to generate RF signals modulated with information from the processor 502 and/or memory 508 for transmission using the antenna 506. The processor 502 in this example operates under stored program control. Software for configuring the processor 502 may be stored in memory within the processor 502 or in the memory 508. The processor 502 is thus configured to implement one or more of the example processes discussed herein for determining when to enter a reduced-responsiveness state and determining when to return to a normal-responsiveness state. It will be appreciated that the diagram of FIG. 5 is illustrative of one embodiment only. In one other example, the processor 502 may be implemented as a hardware state machine, requiring no software, and configured to implement one or more of the example processes described herein.

The processor 502 or the RF transceiver 504, or both, may be implemented by way of programmable integrated circuit components, application-specific integrated circuits, analog devices, or combinations of those components.

CONCLUSION

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of managing battery life of a toll transponder, the method implemented by the toll transponder comprising:
    in a normal responsiveness state, repeatedly detecting trigger signals and sending a response signal in reply to each trigger signal while determining a time window which starts with receipt of a first trigger signal of the trigger signals and during which ones of the trigger signals subsequent to the first trigger signal are received, each of the ones of the trigger signals subsequent to the first trigger signal being received within a threshold time from its preceding trigger signal;
    determining for how long the transponder has been subjected to repeated trigger signals by determining that a maximum time has been reached by said time window during the repeatedly detecting trigger signals and sending response signals; and
    responsive to the maximum time being reached, entering a reduced-responsiveness state during which some detected trigger signals are ignored and at least one detected trigger signal is replied to by sending a response signal.

2. The method of claim 1, wherein said repeatedly detecting comprises:
    starting a first timer on detection of the first trigger signal;
    detecting and responding to the subsequent trigger signals; and
    while detecting and responding to subsequent trigger signals, determining that the time elapsed between successive trigger signals does not exceed the threshold time value.

3. The method of claim 2, wherein said determining that a threshold parameter has been reached comprises determining that the first timer has exceeded said maximum time.

4. The method of claim 2, further comprising:
    zeroing the first timer if the time elapsed between successive trigger signals exceeds the threshold time value, and restarting the first timer when a next trigger signal is received.

5. The method of claim 2, further comprising:
    starting and stopping a second timer prior to said repeatedly detecting; and
    wherein said repeatedly detecting further comprises:
    restarting the second timer on receipt of each trigger signal, and wherein the second timer measures the time since receipt of a most recent trigger signal, and wherein the second timer is compared to the threshold time value.

6. The method of claim 1, wherein entering the reduced-responsiveness state comprises:
    cyclically,
    ignoring detected trigger signals and sending no response signal during a silence period, and
    detecting one or more trigger signals after the silence period and sending a response signal to each of the one or more trigger signals.

7. The method of claim 6, wherein said cyclically ignoring and detecting comprises:
    starting the silence period;
    detecting trigger signals during the silence period and sending no response signal;
    determining that the silence period has expired;
    sending the response signal in response to one or more subsequently detected trigger signals; and
    repeating the starting, detecting that the silence period has expired, determining that the silence period has expired, and sending provided trigger signals continue to be detected within a threshold time value of each other.

8. The method of claim 7, wherein said determining that the silence period has expired comprises one of:
    determining that a maximum number of trigger signals have been ignored during the silence period; and
    determining that a silence period duration has elapsed.

9. The method of claim 7, further comprising:
    if a trigger signal is not detected within a threshold time value of a previous trigger signal, cancelling a cycle of ignoring and detecting and returning to the operation of repeatedly detecting a trigger signal and sending a response signal in reply to each trigger signal.

10. A transponder, comprising an antenna, an RF transceiver, a power source, a processor, and memory, and wherein the processor is configured to:
    in a normal responsiveness state, repeatedly detect trigger signals and send a response signal in reply to each trigger signal while determining a time window which starts with receipt of a first trigger signal of the trigger signals and during which ones of the trigger signals subsequent to the first trigger signal are received, each of the ones of the trigger signals subsequent to the first trigger signal being received within a threshold time from its preceding trigger signal;
    determine for how long the transponder has been subjected to repeated trigger signals by determining that a threshold parameter maximum time has been reached by said time window during the repeatedly detecting trigger signals and sending response signals; and
    responsive to the maximum time being reached, enter a reduced-responsiveness state during which some detected trigger signals are ignored and at least one detected trigger signal is replied to by sending a response signal.

11. The transponder of claim 10, wherein the processor is configured to repeatedly detect by:
    starting a first timer on detection of the first trigger signal;
    detecting and responding to the subsequent trigger signals; and
    while detecting and responding to subsequent trigger signals, determining that the time elapsed between successive trigger signals does not exceed the threshold time value.

12. The transponder of claim 11, wherein the processor is configured to determine that a threshold parameter has been reached by determining that the first timer has exceeded said maximum time.

13. The transponder of claim 11, wherein the processor is further configured to zero the first timer if the time elapsed between successive trigger signals exceeds the threshold time value, and restart the first timer when a next trigger signal is received.

14. The transponder of claim 11, wherein the processor is configured to:
   start and stop a second timer prior to said processor repeatedly detecting; and
   repeatedly detect by restarting the second timer on receipt of each trigger signal, and wherein the second timer measures the time since receipt of a most recent trigger signal, and wherein the second timer is compared to the threshold time value.

15. The transponder of claim 10, wherein the processor is configured to enter the reduced-responsiveness state by:
   cyclically,
      ignoring detected trigger signals and sending no response signal during a silence period, and
      detecting one or more trigger signals after the silence period and sending a response signal in reply to each of the one or more trigger signals.

16. The transponder of claim 15, wherein cyclically ignoring and detecting comprises:
   starting the silence period;
   detecting trigger signals during the silence period and sending no response signal;
   determining that the silence period has expired;
   sending the response signal in response to one or more subsequently detected trigger signals; and
   repeating the starting, detecting, determining, and sending provided trigger signals continue to be detected within a threshold time value of each other.

17. The transponder of claim 16, wherein determining that the silence period has expired comprises one of:
   determining that a maximum number of trigger signals have been ignored during the silence period; and
   determining that a silence period duration has elapsed.

18. The transponder of claim 15, wherein the processor is further configured to, if a trigger signal is not detected within a threshold time value of a previous trigger signal, cancel the cycle of ignoring and detecting and return to the operation of repeatedly detecting a trigger signal and sending a response signal in reply to each trigger signal.

* * * * *